US006965911B1

(12) United States Patent
Coffman et al.

(10) Patent No.: US 6,965,911 B1
(45) Date of Patent: Nov. 15, 2005

(54) EFFICIENTLY EXPORTING LOCAL DEVICE ACCESS ONTO A SYSTEM AREA NETWORK USING A DIRECT-CALL INTERFACE

(75) Inventors: Jerrie L. Coffman, Beaverton, OR (US); Brad R. Rullman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 09/215,788

(22) Filed: Dec. 21, 1998

(51) Int. Cl.$^7$ ............................................. G06F 15/16
(52) U.S. Cl. ...................... 709/201; 709/214; 711/111; 711/114
(58) Field of Search .............................. 709/230, 250, 709/321, 229, 222, 227, 200, 201, 213, 214; 707/204, 203, 10; 711/111, 112, 114, 148

(56) References Cited

U.S. PATENT DOCUMENTS

| | | | | |
|---|---|---|---|---|
| 5,287,453 A | * | 2/1994 | Roberts | 709/201 |
| 5,832,222 A | * | 11/1998 | Dziadosz et al. | 709/216 |
| 5,931,935 A | * | 8/1999 | Cabrera et al. | 710/260 |
| 5,978,815 A | * | 11/1999 | Cabrera et al. | 707/204 |
| 6,061,794 A | * | 5/2000 | Angelo et al. | 713/200 |
| 6,173,374 B1 | * | 1/2001 | Heil et al. | 711/148 |
| 6,321,279 B1 | * | 11/2001 | Bonola | 710/36 |

OTHER PUBLICATIONS

Intelligent Architecture Specifications, version 1.5, Mar. 1997, pp. 1-468.*

* cited by examiner

Primary Examiner—Beatriz Prieto
(74) Attorney, Agent, or Firm—Kenyon & Kenyon

(57) ABSTRACT

A novel module system solution is provided for direct, transparent access to I/O storage devices connected to a host server within a system area network cluster for efficient sharing of resources and databases among all clustered servers. An exemplary driver system comprises a host driver module which may reside on and which may interface to a host operating system, and which establishes service connections with remote data processors on the system area network and provides direct access to the local storage devices while bypassing protocol stacks of the host operating system; an input/output platform (IOP) including a device driver module which may reside on and which may interface the local storage devices for controlling an array of local storage devices; and a local bus which connects and transports messages and data between the host driver module and the input/output platform (IOP). The host driver module may be a software stack which includes a Local Transport for providing an interface to the input/output platform (IOP) on the local bus and communicating with the input/output platform (IOP) across the local bus; a Remote Transport for providing an interface to other nodes of the system area network; and a Connection Manager for providing connection services and coordinating functions responsible for creating a direct call path between the Local Transport and the Remote Transport. The input/output platform (IOP) includes a communication layer which defines an open, standard mechanism for communication between the host driver module and the device driver module. Both the host driver module and the device driver module may constitute a single device that is portable across a plurality of operating systems (OSs) and host network platforms.

27 Claims, 6 Drawing Sheets

EFFICIENTLY EXPORTING LOCAL DEVICE ACCESS ONTO A SYSTEM AREA NETWORK USING A DIRECT-CALL INTERFACE

TECHNICAL FIELD

The present invention relates to a direct-call interface between local and remote transports in a device driver for efficiently exporting local device access to a network.

BACKGROUND

A computer network is a system designed to link together computers, servers, peripherals, storage devices, and communication devices for communications. Examples of such a computer network include a local area network (LAN), a wide are network (WAN), a campus area network (CAN), a metropolitan area network (MAN), and global area network (GAN). The central characteristics of a computer network is sharing, whether that be sharing of cost, resources, or data bases, while at the same time insuring a high degree of data privacy.

As high-speed and high-performance communications become necessary for many applications such as data warehousing, decision support, and transaction processing, many companies have adopted clustering technology for ability to provide availability and scalability for these applications. A cluster is a group of servers, workstations, and/or storage devices that are linked together to operate as a single system to deliver high performance, low latency, and extreme reliability. Clustering offers three primary benefits: scalability, availability, and manageability. Scalability is obtained by allowing servers to work together and to allow additional services to be added for increased processing as needed. The cluster combines the processing power of all servers within the cluster to run a single logical application (such as a database server). Availability is obtained by allowing servers to "back each other up" in the case of failure. Likewise, manageability is obtained by allowing the cluster to be utilized as a single, unified computer resource, that is, the user sees the entire cluster (rather than any individual server) as the provider of services and applications.

High-performance network technologies known as system area networks (SANs) have recently been developed for linking servers and network-connected storage devices within a cluster. Virtual Interface (VI) Architecture is designed to enable applications to communicate over a system area network (SAN). Basically, the VI Architecture provides a transport service which allows a collection of independent standards-based servers to be utilized as a highly scalable cluster to meet the performance and capacity requirements of the largest and most demanding enterprise applications. Its fast server-to-server communications can enhance an application's scalability and performance in a variety of ways—from allowing a single application to run efficiently across dozens of clustered nodes, to speeding up the exchange of data between distributed application modules running on different application servers.

One of the inherent challenges of the system area network (SAN) is to design a data transport mechanism that can deliver a large amount of data between nodes in the cluster ("high bandwidth"), and that can exchange messages quickly between nodes in the cluster ("low latency"). Traditional data transports between nodes in a cluster are done through the network infrastructure provided by a host operating system (OS). The operating system (OS) structure requires large amount of system processing overhead and extended processing time with respect to each message.

In particular, for a specific application such as access of a storage device of a remote server in a cluster, standard interfaces provided by the host operating system (OS) such as file system application program interfaces (API) are used to access a network file system (NFS). However, direct access to storage devices of remote servers within a cluster through input/output (I/O) subsystems was not performed transparently. Each request for a data transfer in the traditional data transports incurred a large amount of processing overhead of operating system (OS) stacks on both the local and remote servers of the cluster. This overhead limits input/output (I/O) bandwidth, increases input/output (I/O) latency, and increases the response time to the application.

Current alternative to high network overhead is for another application to generate special application-to-application messages to the remote node in order to access a remote server in a cluster. A remote application running on the remote node must issue an input/output (I/O) request to the remote operating system (OS) on behalf of the local application. This way the operating system (OS) overhead on the local server is avoided, but there are still a great deal of coordination between cooperating applications of the local server and the remote server.

Therefore, there is an urgent need for providing a direct, transparent access to storage devices connected to a host server within a network for efficient sharing of resources and databases among all network members.

SUMMARY

Accordingly, the present invention is designed to provide an exemplary input/output platform (IOP) access module in a host system for providing input/output device access between a host system and another system. An exemplary input/output platform (IOP) access module includes a Local Transport arranged to provide an interface to an input/output platform (IOP) supporting an array of input/output devices; a Remote Transport arranged to provide an interface to another system; and a Connection Manager arranged to establish connection services and to create a direct call path between the Local Transport and the Remote Transport so as to provide access to input/output devices.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

While the following detailed description focuses on an exemplary implementation providing a connection arrangement between an input/output platform (IOP) of a host server and other remote servers of a system area network (SAN), the present invention is not limited thereto. More particularly, the present invention may be equally applicable for implementation with other types of networks or other types of device interconnections (e.g., non-networked and/or non-clustered devices), and between other types of devices.

Figure 1:
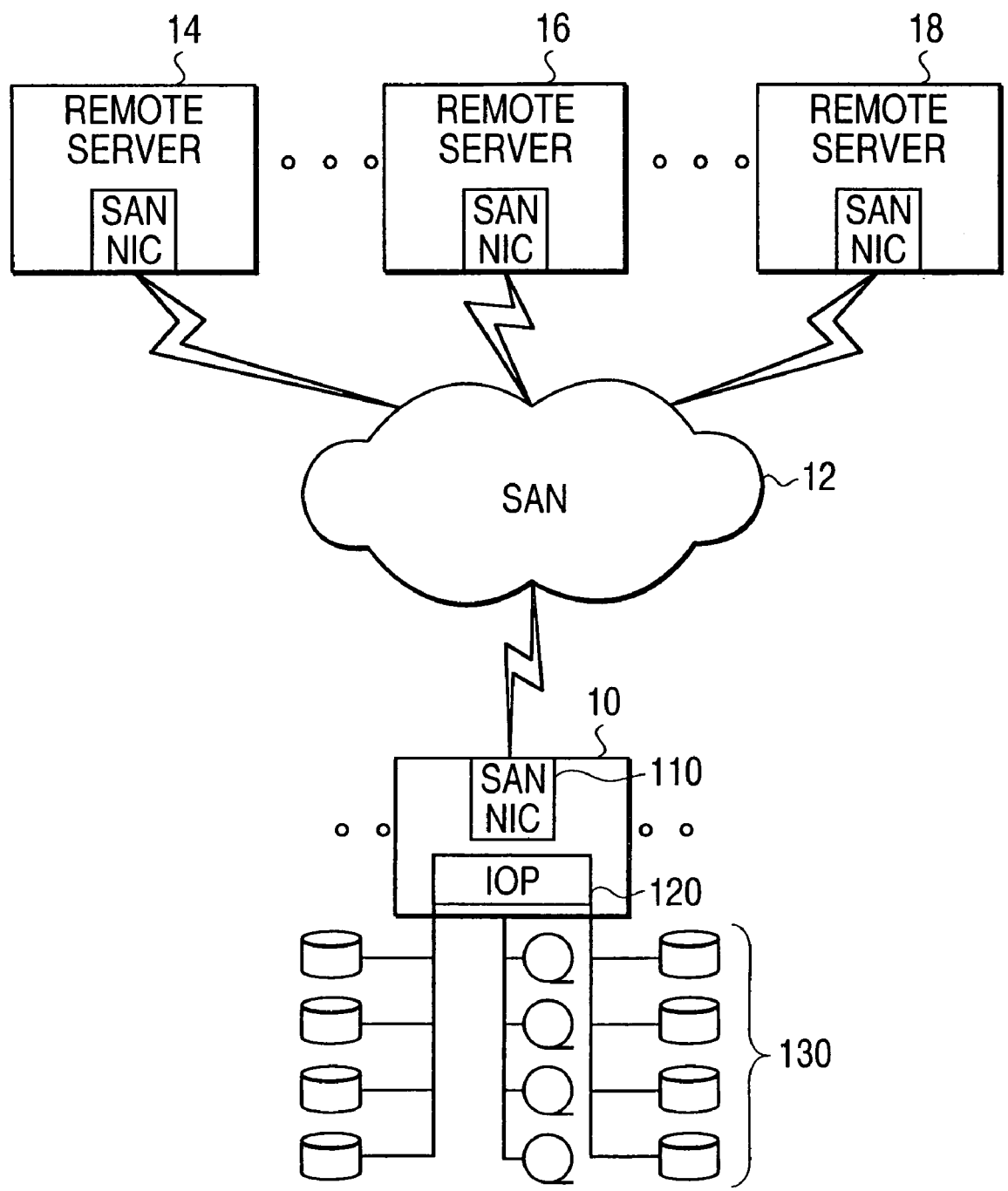
FIG. 1 illustrates an exemplary background system area network (SAN) cluster of host and remote servers.

Reference is now made to exemplary arrangements and particularly to FIG. 1 which illustrates an exemplary background cluster of a host server 10 and remote servers 14, 16, 18 connected to a system area network (SAN) 12. Each server is an autonomous system which can include one or more processors, memory, one or more input/output platforms and other local I/O resources. Examples of such a server include desktop computers (PCs) and workstations. As shown in FIG. 1, each server such as a host server 10 can include at least one SAN network interface card (NIC) 110 attached to a local bus, an input/output (I/O) platform (IOP) 120 of one or more input/output (I/O) processors, and an array of disk storage devices 130.

Figure 2:
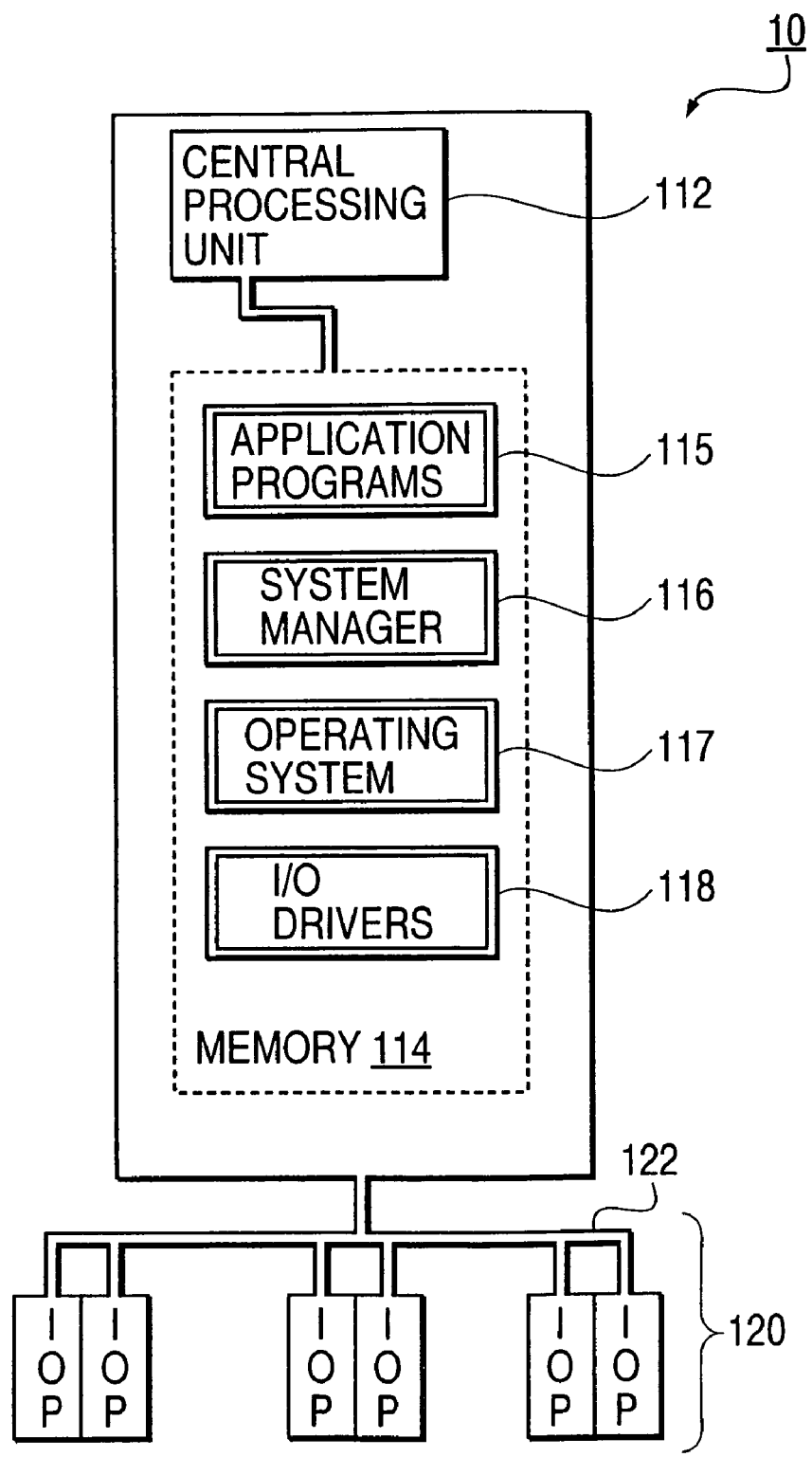
FIG. 2 illustrates an exemplary background server using a host operating system (OS) for providing network infrastructure for data transports between nodes in a cluster.

Further, each server, as shown in FIG. 2, can include one or more processors 112, a primary memory 114 containing application programs 115, a system manager 116, an operating system (OS) 117, and I/O driver modules 118 all interconnected to the I/O platform 120 of one or more I/O processors via a local bus 122. The operating system (OS) 117 provides traditional network infrastructure for data transports between nodes in a cluster using an industry standard Internet protocol (TCP/IP) and network file system (NFS) protocol stacks, although any other industry standard such as an Open Systems Interconnection (OSI) protocol stack may also be used for networking purposes. General descriptions of these software protocol stacks, particularly, the TCP/IP and NFS protocol stacks can be found in Tanenbaum, "*Computer Networks*" (Second Edition, Prentice Hall: 1988).

However, the exemplary background host operating system (OS) structure requires a large amount of system processing overhead and an extended processing time to process and send each message between the local and remote servers in a cluster. This overhead limits the I/O bandwidth and increases the I/O latency of the cluster. While there are alternatives to avoiding the operating system (OS) overhead on local and remote servers, such as coordinating special application-to-application messages between the local and remote servers, more effective solutions for providing direct, transparent access to storage devices connected to servers within a system area network cluster are needed without incurring the overhead of the operating system (OS) protocol stack and without coordinating special application-to-application messages between nodes in a system area network (SAN) cluster.

Figure 3:
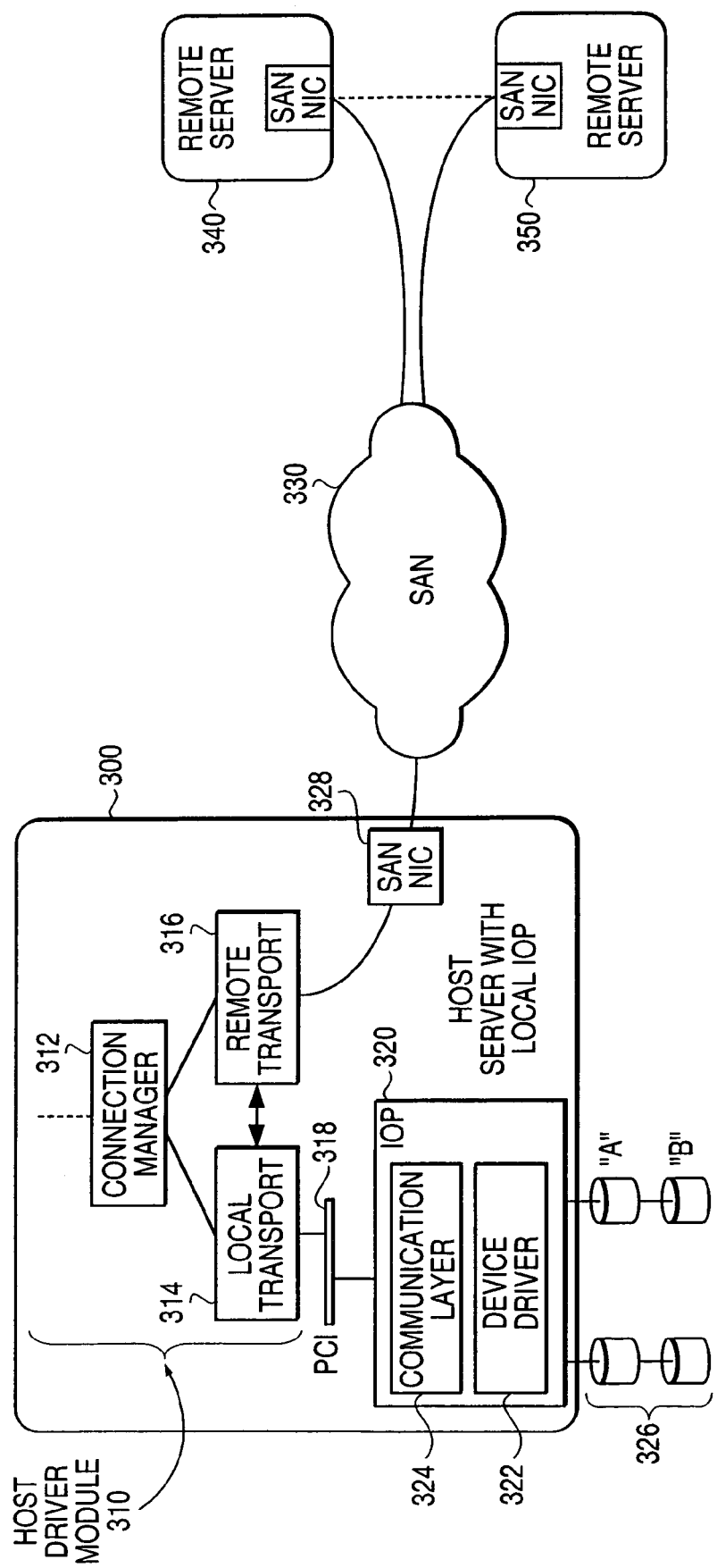
FIG. 3 illustrates an exemplary driver system for providing direct, transparent access to local storage devices connected to a host or remote server within a system area network (SAN) cluster, for efficient sharing of resources and databases among all clustered servers according to the principles of the present invention.

Attention now turns to FIG. 3 which illustrates an exemplary driver system solution for providing a direct, transparent access to I/O storage devices connected to a host server 300 within a system area network (SAN) 330 cluster for efficient sharing of resources and databases among all clustered servers 300, 340, 350 according to the principles of the present invention. Each server as intended by the present invention is an autonomous system which may include one or more processors, a memory, one or more input/output platforms and other local I/O resources, such as a desktop computer (PC) or a workstation. The exemplary driver system according to the present invention is designed to avoid using special application-to-application messages between nodes within a SAN cluster and to bypass the layers of OS protocol stacks, thereby avoiding the overhead of the traditional network infrastructure in the operating system (OS) while concomitantly increasing the number of CPU cycles available for other data processes. The host server 300 as intended has a host operating system (OS) (not shown), and a host driver module 310 installed and dynamically configured to accept communication requests from remote servers 340 and 350 through a SAN network interface card (NIC) 328. Such a host driver module 310 (alternatively known as an input output platform (IOP) access module) may be provided as any one of a hardware module, a combined hardware/software module, and a software module. A software or partial software implementation is advantageous in that upgrades can be easily downloaded (e.g., from a tangible medium such as a disk, or via the internet) for flexible/easy reconfiguration of the host driver module 310 and the host server 300.

As shown in FIG. 3, the exemplary driver system may include a host driver module 310 which resides on and which may interface with the host operating system (OS), a local bus 318 such as a Peripheral Component Interconnect (PCI) bus, and an Input/Output Platform (IOP) 320 for controlling an array of storage devices 326. Other popular bus varieties such as Extended Industry Standard Architecture (EISA), Video Electronics Standards Association (VESA) may be used for transporting data from the host device driver module 310 to the local IOP 320 and, vice versa. The disk storage devices 326 may include, for example, a magnetic storage device and/or an optical storage device for storing programs and databases. The Input/Output Platform (IOP) 320 may include at least one input/output (I/O) processor (not shown).

The IOP 320 contains a device driver module 322 which resides on and interfaces with the particular controller and storage devices, and a communication layer 324 which defines an open, standard mechanism for communication between the host driver module 310 and the device driver module 322. The device driver module 322 is responsible for control and data transfer of the hardware devices, such as storage devices. The communication layer 324 may include a message layer which sets up a communication session, and a transport layer which defines how information will be shared. Collectively, the communication layer 324 may be responsible for managing all requests, and providing a set of Application Programming Interfaces (APIs) for delivering messages, along with a set of support routines that process them.

The driver system, as shown in FIG. 3, may be designed in accordance with the Intelligent Input/Output ($I_2O$) Architecture Specification for allowing input/output (I/O) subsystems such as storage devices to operate independently from both the specific device being controlled and the host operating system (OS). Both the driver module 310 and the device driver module 322 of the IOP 320 may be provided as separate modules, or may be provided via a single device driver that is portable across a plurality of operating systems (OSs) and host network platforms, and may be designed to work interoperably with different combinations of I/O storage devices and operating systems (OSs). Typically, the host driver module 310 is the host OS-specific portion of the driver system that interfaces with the host OS, whereas the device driver module 322 is a device-specific portion of the driver system that interfaces with the particular controllers and I/O devices.

Again, the host driver module 310 as intended by an exemplary embodiment of the present invention is software including the following device driver components: a Connection Manager 312, a Local Transport 314, and a Remote Transport 316. However, hardware or mixed hardware/software equivalent devices may be optionally installed to perform the same functions of the host driver module 310 including the Connection Manager 312, the Local Transport 314, and the Remote Transport 316. In one exemplary embodiment of the present invention, the Local Transport 314 provides an interface to the IOP 320 on the PCI bus 318 and communicates with the IOP 320 across the PCI bus 318. The Remote Transport 316 provides an interface to other nodes such as remote servers 340 and 350 within the SAN cluster 330. The Connection Manager 312 provides connection services and the coordinating function responsible for creating a direct call path between the Local Transport 314 and the Remote Transport 316.

Figure 4:
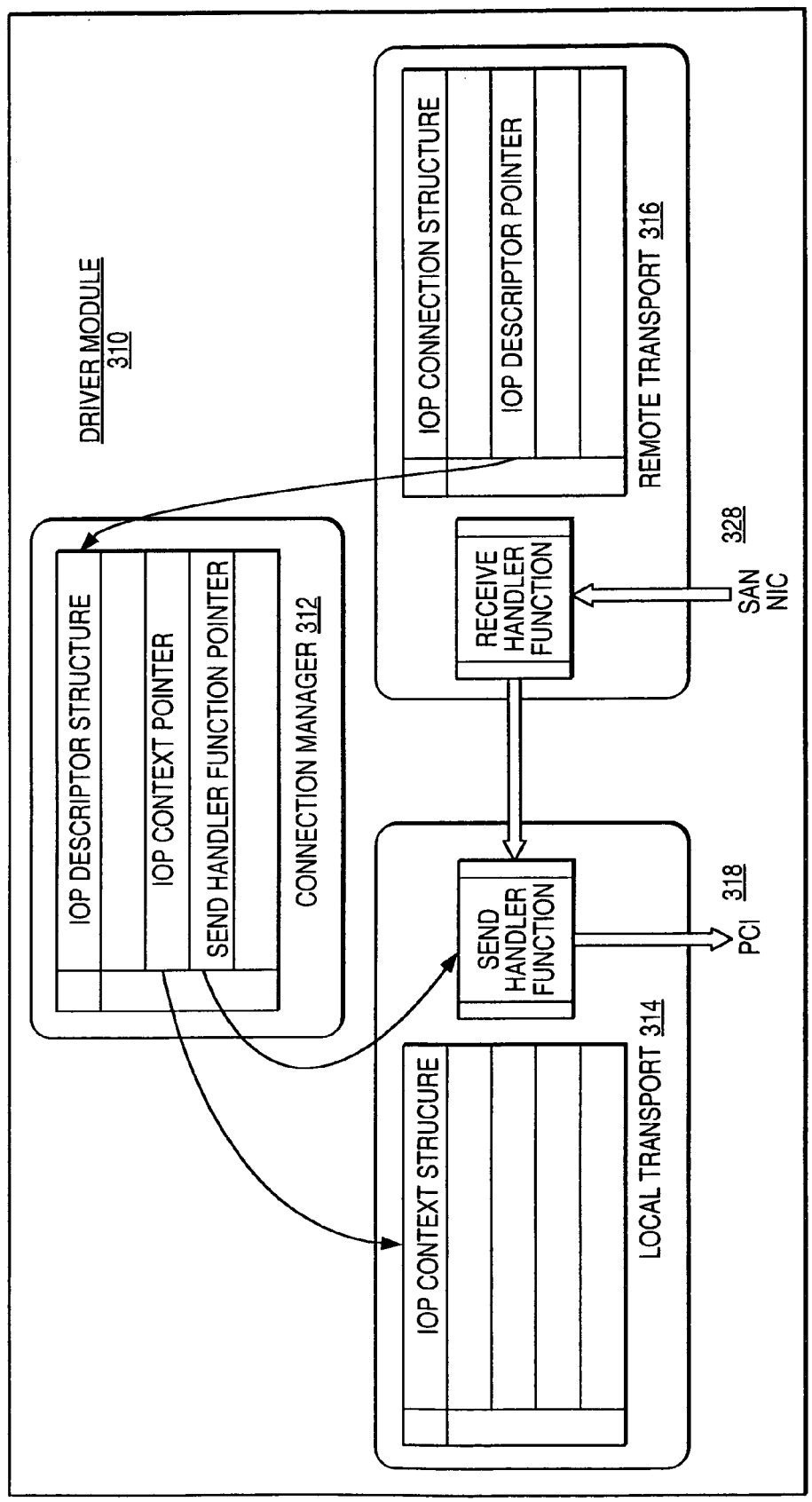
FIG. 4 illustrates exemplary data structures established during initialization for a direct call interface between local and remote transports in an exemplary driver system according to the principles of the present invention.

The host server 300 and the exemplary driver system as shown in FIG. 3 may power-up and initialize independently with respect to other nodes such as remote servers 340 and 350 within the SAN cluster 330. The host server 300 is initialized by the specific OS software. When the exemplary driver system is initialized, the Local Transport 314 scans the PCI bus 318 to locate and initialize all local IOPs 320 (assuming more than one I/O processor is installed) and builds an opaque "context" structure for each IOP found, as will be later described in conjunction with FIG. 4. The Remote Transport 316 prepares to accept requests from a remote server through the SAN network interface card (NIC) 328. The Connection Manager 312 then queries the Local Transport 314 to determine the number of IOPs and builds a descriptor structure for each IOP. This IOP descriptor structure, as shown in FIG. 4, includes an exported table of function call pointers and the context required by the Local Transport 314 to communicate with each IOP. Next, the Connection Manager 312 establishes a SAN management communication channel through the Remote Transport 316, and waits for an external connection from a remote server on a SAN for exporting local device access onto the SAN 330 by way of a direct call interface between the Local Transport 314 and the Remote Transport 316.

Refer now to FIG. 4 which illustrates data structures established during initialization for a direct call interface between Local Transport 314 and Remote Transport 316 by the Connection Manager 312 for an inbound message from a remote SAN server for direct access to local IOP 320 in the exemplary driver system according to the present invention. The Local Transport 314 builds a list of different IOP context structures if different IOPs are available in the host server 300. Each IPO context structure includes different designations for direct access to each IOPs. However, since only one IOP 320 is illustrated for purposes of discussion, a corresponding opaque IOP context structure is set for communication with the local IOP 320. In addition, the Local Transport 314 also has a send handler function which is a program interface to receive an inbound message from a remote SAN server for direct access to local IOP 320.

The Connection Manager 312 builds an IOP descriptor structure for each IOP found. Each IOP descriptor structure includes an exported table of function call pointers such as IOP context pointer and send handler function pointer required by the Local Transport 314 to communicate with the IOP 320. The Remote Transport 316 builds an IOP connection structure including at least an IOP descriptor pointer which refers to the IOP descriptor structure of the Connection Manager 312 for making a direct call to the Local Transport 314 through the send handler function. In addition, the Remote Transport 316 also has a receive handler function which is a program interface to receive an inbound message from a remote server on a SAN for direct access to local IOP 320 and to deliver an outbound message to a remote server on a SAN. For an outbound message to a remote server on a SAN, data structures established for a direct call interface between Local Transport 314 and Remote Transport 316 by the Connection Manager 312 as shown in FIG. 4 remain the same. However, the communication directions between the send handler function in the Local Transport 314 and the receive handler function in the Remote Transport 316 are reversed.

After initialization, the exemplary driver system as shown in FIG. 3 is prepared for providing a direct, transparent access to I/O storage devices within a system area network (SAN) cluster that bypasses the traditional OS protocol stacks for efficient sharing of resources so as to avoid incurring the overhead of the OS stack and coordinating special application-to-application messages between nodes of a SAN cluster. An exemplary direct call interface between the Local Transport 314 and the Remote Transport 316 of the host driver module 310 established for the purpose of exporting device access to host servers on a system area network (SAN) will be described in detail with reference to FIGS. 4, 5 and 6 hereinbelow.

First, in order to establish a service connection to an IOP 320, that is a logical connection of an IOP to a remote server for the purpose of sending messages and transporting data therebetween, a remote server 340 or 350 in a system area network (SAN) connects to and exchanges messages with the Connection Manager 312. Messages exchanged between the Connection Manager 312 of the exemplary driver system and the remote server are based on a protocol specified by the network used and/or the Intelligent I/O Architecture. The Connection Manager 312 next advertises the presence of local IOPs that are available for external use. In the exemplary embodiment of the present invention as shown in FIG. 3, only one IOP 320 is illustrated for purposes of discussion. Additional IOPs may be connected to PCI bus 318.

When a remote server 340 or 350 requests a service connection to an IOP 320, the Connection Manager 312 passes the address of an IOP descriptor structure as shown in FIG. 4 to the Remote Transport 316 to establish the service connection. The IOP descriptor structure provides the Remote Transport 316 access to the function call pointers and context required by the Local Transport 314 to communicate directly with the IOP 320.

When a service connection to a local IOP 320 is established by remote server 340 or 350 and the Connection Manager 312 of the host server 300, low latency and high-bandwidth messages passing between nodes is obtained by bypassing the layers of OS protocol stacks when sending and receiving messages. Data structure pointers are exchanged to establish a direct call relationship between software modules on the host server 300 within a system area network (SAN) 330. To deliver an inbound message from a remote server on a system area network (SAN) 330, the receive handler function in the Remote Transport 314 simply refers to the IOP descriptor structure of the Connection Manager 312 to make a direct call to the send handler function in the Local Transport 314, providing the function with the IOP context and the message frame pointer. Likewise, an outbound message from the Local Transport 314 is delivered to a send handler function (not shown) in the Remote Transport 316. However, the outbound message includes a pointer to a structure containing the function address and context required by the Remote Transport 316 to send the message to a remote server 340 or 350 within a system area network (SAN) 330.

Figure 5:
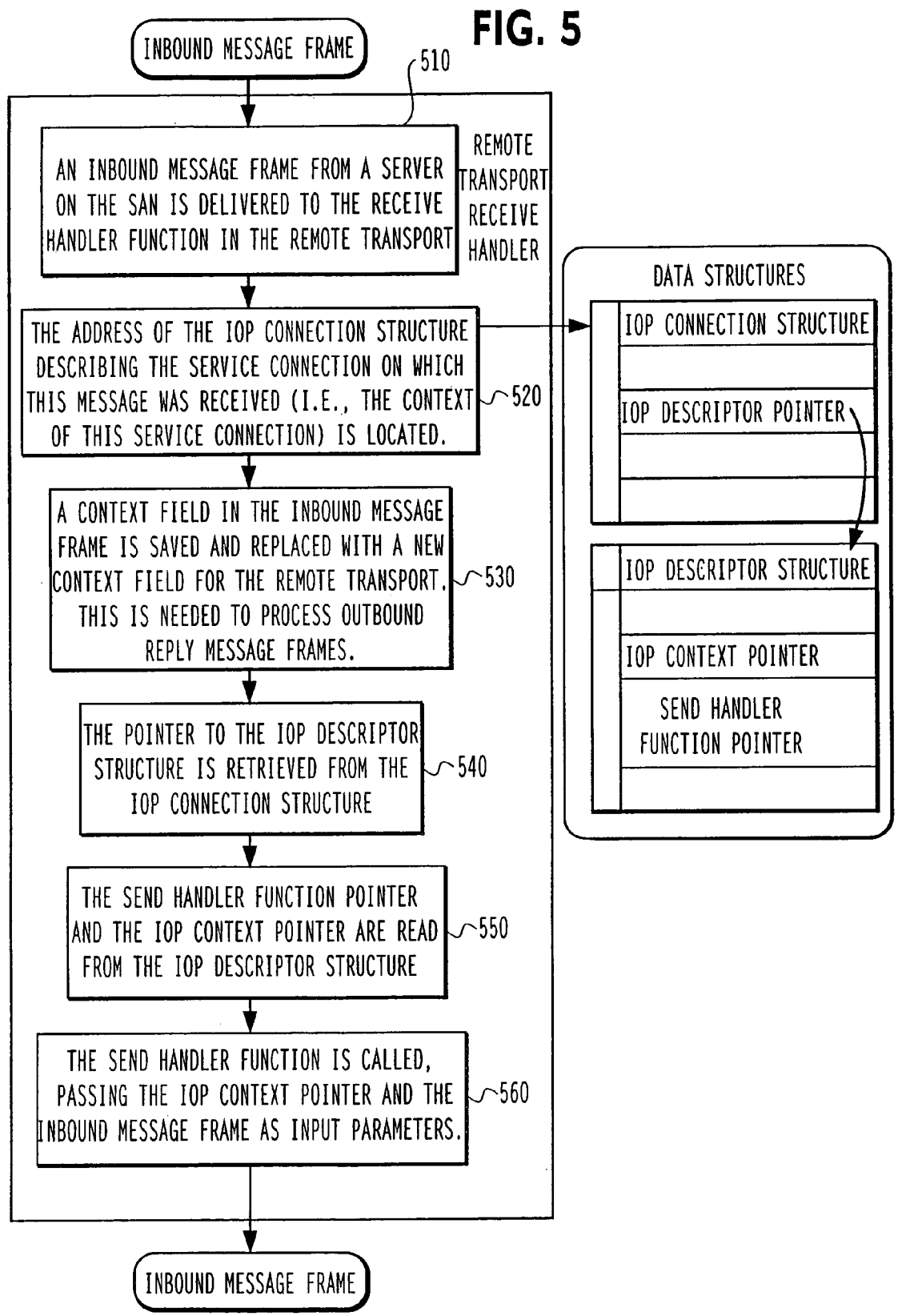
FIG. 5 is a flowchart of an exemplary process of routing an inbound message through the local and remote transports in an exemplary driver system from a remote server within a system area network (SAN) according to the principles of the present invention.

FIG. 5 illustrates an exemplary step-by-step process of routing an inbound message or data from a remote server 340 or 350 of a system area network (SAN) through the Local Transport 314 and Remote Transport 316 by the Connection Manager 312 of an exemplary driver system according to the principles of the present invention. Each message is transmitted in a series of frames. When a service connection is requested from a remote server, an inbound message frame from a remote server on the system area network (SAN) is delivered to the receiver handler function in the Remote Transport 316 at step 510. The address of the IOP connection structure describing the service connection on which the inbound message was received (i.e., the context of the service connection) is located at the Remote Transport 316 at step 520. The IOP descriptor structure is located by using an IOP descriptor pointer to refer to the IOP descriptor structure of the Connection Manager 312.

Next, a context field in the inbound message frame is saved and replaced with a new context field for the Remote Transport 316 at step 530. The pointer to the IOP descriptor structure of the Connection Manager 312 is retrieved from the IOP connection structure at step 540. Then, the send handler function pointer and the IOP context pointer are read from the IOP descriptor structure of the Connection Manager 312 at step 550. The send handler function in the Local Transport 314 is called in order to pass the inbound message frame using the IOP context pointer in step 560.

Figure 6:
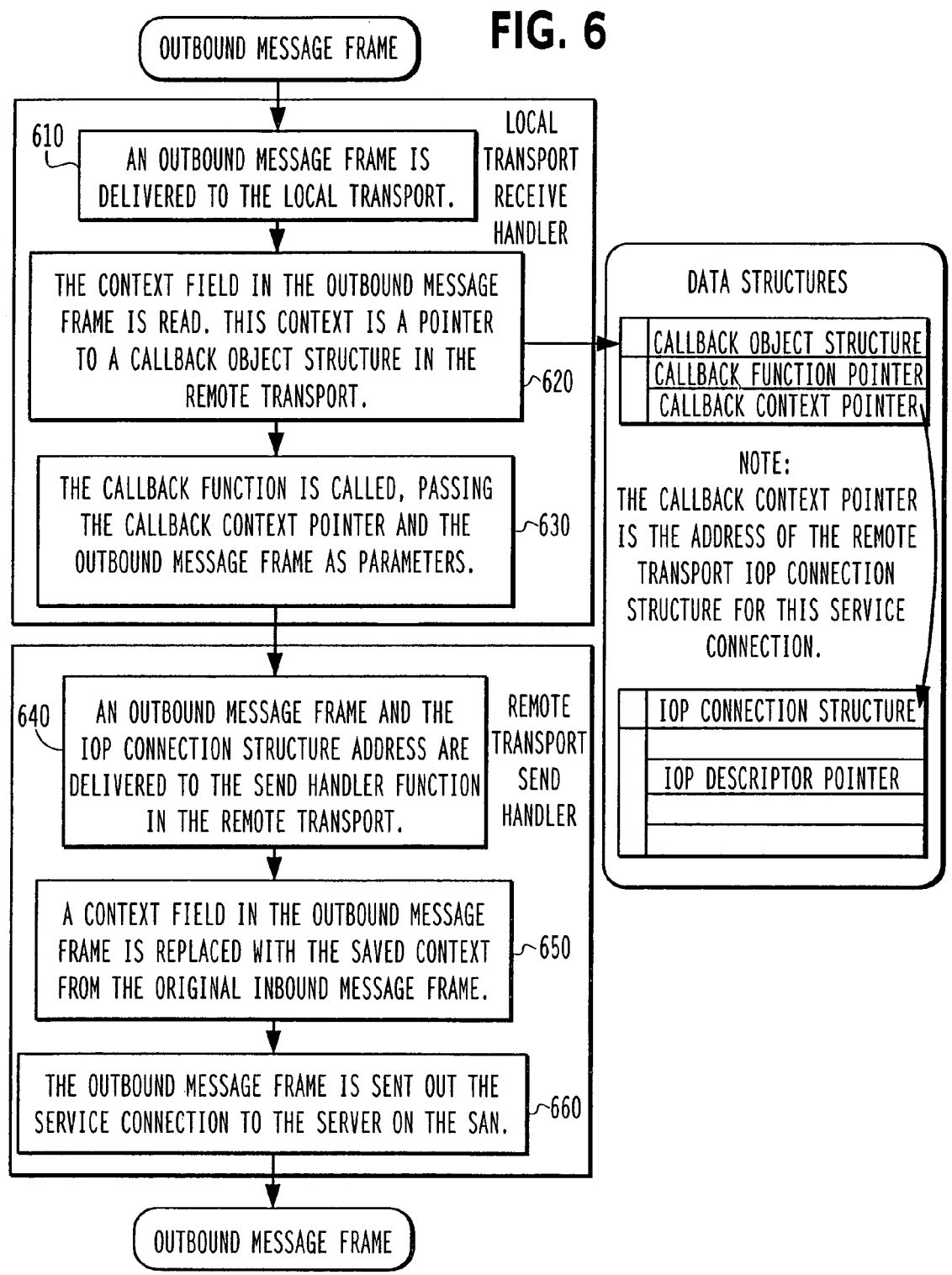
FIG. 6 is a flowchart of an exemplary process of routing an outbound message from a local I/O platform (IOP) of an exemplary driver system to a remote server within a system area network (SAN) according to the principles of the present invention.

Likewise, FIG. 6 illustrates an exemplary step-by-step process of routing an outbound message or data from a local I/O platform (IOP) 320 of an exemplary driver system to a remote server of a system area network (SAN) according to the principles of the present invention. Again, each message is transmitted in a series of message frames. When an outbound message is routed to a remote server on a system area network (SAN), an outbound message frame is delivered to the send handler function in the Local Transport 314 at step 610. The context field in the outbound message frame is read at step 620. This context is a pointer to a callback object structure in the Remote Transport 316 which contains the address of the Remote Transport IOP connection structure for a service connection.

Next, the callback function is called, passing the callback context pointer and the outbound message frame as outgoing parameters at step 630. At the Remote Transport 316, an outgoing message frame and the IOP connection structure address are delivered to the send handler function at step 640. A context field in the outgoing message frame is replaced with the saved context from the original inbound message frame as described with reference to FIG. 5, at step 650. Then, the outgoing message frame is sent out the service connection to a remote server on a SAN at step 660.

As described, the present invention provides a sophisticated driver system of a server system that is designed to bypass the layers of OS protocol stacks without incurring the overhead of the traditional network infrastructure in the operating system (OS), and to avoid using special application-to-application messages between nodes within a SAN cluster. The driver system may be configured in accordance with an Intelligent Input/Output ($I_2O$) Architecture specification with a host driver module and a device driver module interconnected by a communication layer for available operations with different combinations of I/O storage devices and operating systems (OSs).

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. In addition, many modifications may be made to adapt a particular situation to the teachings of the present invention without departing from the central scope thereof. Therefore, it is intended that the present invention not be limited to any particular exemplary embodiment disclosed, but that the present invention includes all embodiments falling within the scope of the appended claims.

What is claimed is:

1. An input/output platform (IOP) access module installed in a host system for providing input/output device access between the host system and another system, via a data network, said IOP access module comprising:

a Local Transport arranged to provide an interface to an input/output platform (IOP) supporting an array of input/output devices;

a Remote Transport arranged to provide an interface to said another system, via said data network; and a Connection Manager arranged to establish connection services and to create a direct call path between the Local Transport and the Remote Transport so as to provide access to input/output devices, wherein the Connection Manager inquires the Local Transport to determine the number of input/output platforms (IOPs), builds an IOP descriptor structure for each input/output platform (IOP) which includes an exported table of function call pointers and the context required by the Local Transport to communicate with the input/output platform (IOP).

2. The input/output platform (IOP) access module of claim 1, wherein said IOP access module is one of a hardware module, a combined hardware/software module, and a software module provided on a tangible medium.

3. The input/output platform (IOP) access module of claim 2, further comprising said IOP which comprises:

at least one or more input/output processors;

at least one storage device as said input/output devices;

a device driver module arranged to interface with said storage device;

a communication layer which defines a mechanism for communications between the Local Transport and the device driver module.

4. The input/output platform (IOP) access module of claim 3, wherein said communication layer is responsible for managing all service requests and providing a set of Application Programming Interfaces (APIs) for delivering messages, along with a set of support routines that process the messages.

5. The input/output platform (IOP) access module of claim 4, wherein said communication layer comprises a message layer which sets up a communication session, and a transport layer which defines how information will be shared.

6. The input/output platform (IOP) access module of claim 1, wherein said host system corresponds to a host server, said another system corresponds to any one of remote servers, via said data network.

7. A host system, comprising:
a processor including an operating system (OS);
an array of storage devices;
a driver module for exporting local storage device access onto a computer network, said driver module comprising:
   a device driver module arranged to provide an interface to said array of local storage devices;
   a host driver module arranged to provide an interface to the operating system (OS), said host driver module comprising a Local Transport which communicates with the device driver module, a Remote Transport which provides an interface to said computer network, and a Connection Manager which establishes connection services with remote systems on said computer network and coordinates functions responsible for creating a direct call path between the Local Transport and the Remote Transport to provide access to said storage devices, including to determine, via the Local Transport, the number of input/output platforms (IOPs), build an IOP descriptor structure for each input/output platform (IOP) including an exported table of function call pointers and the context required by the Local Transport to communicate with the input/output platform (IOP); and
   a communication layer which supports communications between the host driver module and the device driver module.

8. The host system of claim 7, wherein said host system corresponds to a host server, said remote systems corresponds to remote servers arranged in a cluster, and said computer network corresponds to a system area network for communications between said host system and said remote systems within said cluster.

9. The host system of claim 7, wherein said communication layer is responsible for managing all service requests and providing a set of Application Programming Interfaces (APIs) for delivering messages, along with a set of support routines that process the messages.

10. The host system of claim 9, wherein said communication layer comprises a message layer which sets up a communication session, and a transport layer which defines how information will be shared.

11. The host system of claim 9, wherein said host driver module and said device driver module constitute a single device that is portable across a plurality of operating systems and host network platforms, and works interoperably with a plurality of storage devices and operating systems.

12. The host system of claim 9, wherein said host driver module and said device driver module operate in accordance with an Intelligent Input/Output ($I_2O$) specification for allowing storage devices to operate independently from the operating system (OS).

13. The host system of claim 7, wherein said driver module is one of a hardware module, a combined hardware/software module, and a software module provided on a tangible medium.

14. A driver configuration of a host server for exporting local storage device access onto a computer network, comprising:
an input/output platform (IOP) arranged to control an array of local storage devices; and
a system driver module comprising:
   a Local Transport arranged to provide an interface to said input/output platform (IOP);
   a Remote Transport arranged to provide an interface to said computer network; and
   a Connection Manager arranged to establish connection services with remote servers on said computer network and coordinate functions responsible for creating a direct call path between the Local Transport and the Remote Transport to provide access to the local storage devices, including to determine, via the Local Transport, the number of input/output platforms (IOPs), build an IOP descriptor structure for each input/output platform (IOP) including an exported table of function call pointers and the context required by the Local Transport to communicate with the input/output platform (IOP).

15. The driver configuration of claim 14, wherein said input/output platform (IOP) supports at least one or more input/output processors, and comprises:
   a device driver module which interfaces the local storage devices for controlling said array of local storage devices; and
   a communication layer which defines a mechanism for communications between the system driver module and the device driver module.

16. The driver configuration of claim 15, wherein said communication layer is responsible for managing and dispatching all service requests and providing a set of Application Programming Interfaces (APIs) for delivering messages, along with a set of support routines that process the messages, and is comprised of a message layer which sets up a communication session, and a transport layer which defines how information will be shared.

17. The driver configuration of claim 15, wherein said system driver module and said device driver module constitute a single device that is portable across a plurality of host operating systems and host network platforms, and works interoperably with a plurality of storage devices and host operating systems.

18. The driver configuration of claim 15, wherein said system driver module and said device driver module operate in accordance with an Intelligent Input/Output ($I_2O$) specification for allowing storage devices to operate independently from the operating system of the host server.

19. The driver configuration of claim 15, wherein, upon initialization, said Local Transport scans the local bus so as to locate and initialize all local input/output platforms (IOPs) and builds an opaque "context" structure for each input/output platform (IOP), wherein said Remote Transport prepares to accept requests from a remote server through said computer network, and wherein said Connection Manager further establishes a network management communication channel through the Remote Transport after building the IOP descriptor structure, which waits for an external connection from said remote server on said computer network for exporting local device access onto said computer network using said direct call path between the Local Transport and the Remote Transport.

20. The driver configuration of claim 19, wherein said Local Transport further has a send handler function and said Remote Transport further has a receive handler function which are respective program interfaces for receiving an inbound message from a remote server on said computer network for direct access to local input/output platform and for delivering an outbound message to said remote server on said computer network.

21. The driver configuration of claim 19, wherein said Remote Transport further builds an IOP connection structure including at least an IOP descriptor pointer which refers to the IOP descriptor structure of the Connection Manager for making a direct call to the Local Transport through the receive handler function and the send handler function.

22. A process of establishing a service connection to a local input/output platform (IOP) connected to a local bus using a system driver module in response to a request from a remote server on a system area network, comprising the steps of:

beginning initialization of said driver module which provides access to a local storage system while bypassing protocol stacks of a host operating system, said system driver module comprising a Local Transport which provides direct access to the local storage device system, a Remote Transport which interfaces to other nodes of said system area network, and a Connection Manager which provides connection services and coordinates functions responsible for creating a direct call path between the Local Transport and the Remote Transport;

scanning, at said Local Transport, the local bus to locate and initialize all local input/output platforms (IOPs), and building an IOP context structure for each input/output platform (IOP) found;

preparing, at said Remote Transport, to accept a request for a service connection from said remote server on said system area network;

asking, at said Connection Manager, whether said Local Transport determines the number of input/output platforms (IOPs), and building a descriptor structure for each input/output platform (IOP) which includes an exported table of function call pointers and the context required by the Local Transport to communicate with the input/output platform (IOP); and establishing a system area network management communication channel through the Remote Transport, which waits for an external connection from said remote server on said system area network for exporting local device access onto said system area network using said direct call path between the Local Transport and the Remote Transport.

23. The process of claim 22, wherein said input/output platform (IOP) comprises:

a device driver module which interfaces the local storage devices, and which controls an array of local storage devices; and a communication layer which defines a mechanism for communication between the system driver module and the device driver module.

24. The process of claim 23, wherein said communication layer is responsible for managing and dispatching all service requests and providing a set of Application Programming Interfaces (APIs) for delivering messages, along with a set of support routines that process the messages, and is comprised of a message layer which sets up a communication session, and a transport layer which defines how information will be shared.

25. The process of claim 22, wherein said system driver module and said device driver module constitute a single device that is portable across a plurality of host operating systems and host network platforms, and operate in accordance with an Intelligent Input/Output ($I_2O$) specification for allowing storage devices to operate independently from the host operating system.

26. The process of claim 22, wherein said Local Transport further has a send handler function and said Remote Transport further has a receive handler function which are respective program interfaces for receiving an inbound message from a remote server on said system area network for direct access to local input/output platform (IOP) and for delivering an outbound message to said remote server on said system area network.

27. The process of claim 26, wherein said Remote Transport further builds an IOP connection structure including at least an IOP descriptor pointer which refers to the IOP descriptor structure of the Connection Manager for making a direct call to the Local Transport through the receive handler function and the send handler function.

* * * * *